United States Patent
Dewar et al.

(10) Patent No.: US 6,752,618 B2
(45) Date of Patent: Jun. 22, 2004

(54) INJECTION MANIFOLD HAVING A VALVE PIN GUIDING DEVICE

(75) Inventors: Neil Dewar, Georgetown (CA); Denis Babin, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 33 days.

(21) Appl. No.: 10/022,282

(22) Filed: Dec. 20, 2001

(65) Prior Publication Data

US 2003/0118687 A1 Jun. 26, 2003

(51) Int. Cl.⁷ .............................................. B29C 45/23
(52) U.S. Cl. ........................................ 425/564; 425/572
(58) Field of Search ................................ 425/562, 563, 425/564, 565, 566, 572, 588

(56) References Cited

U.S. PATENT DOCUMENTS

| | | | |
|---|---|---|---|
| 3,716,318 A | 2/1973 | Erik et al. ................... | 425/245 |
| 3,940,224 A | 2/1976 | Armour | |
| 4,017,242 A | 4/1977 | Mercer ....................... | 425/243 |
| 4,111,635 A | 9/1978 | Rainville | |
| 4,126,292 A | 11/1978 | Saeki et al. | |
| 4,299,553 A | 11/1981 | Swaroop .................... | 425/572 |
| 4,609,138 A | 9/1986 | Harrison ..................... | 228/161 |
| 4,781,572 A | 11/1988 | Boring ........................ | 425/564 |
| 4,932,858 A | 6/1990 | Gellert ........................ | 425/564 |
| 5,192,556 A | 3/1993 | Schmidt ..................... | 425/549 |
| 5,227,181 A | 7/1993 | Knudsen | |
| 5,295,806 A | 3/1994 | Gunther ...................... | 425/547 |
| 5,366,369 A | 11/1994 | Gellert ........................ | 425/549 |
| 5,374,182 A | 12/1994 | Gessner ...................... | 425/562 |
| 5,441,197 A | 8/1995 | Gellert et al. ............ | 228/248.1 |
| 5,518,393 A | 5/1996 | Gessner ...................... | 425/549 |
| 5,683,731 A | 11/1997 | Deardurff et al. | |
| 5,762,976 A | 6/1998 | Brown ........................ | 425/190 |
| 5,811,140 A | 9/1998 | Manner ...................... | 425/564 |
| 5,849,343 A * | 12/1998 | Gellert et al. ............... | 425/566 |
| 5,955,121 A | 9/1999 | Gellert et al. ............... | 425/549 |
| 6,007,108 A | 12/1999 | Braun ...................... | 285/125.1 |
| 6,077,470 A | 6/2000 | Beaumont | |
| 6,309,208 B1 | 10/2001 | Kazmer et al. ............. | 425/562 |
| 6,382,528 B1 * | 5/2002 | Bouti .......................... | 425/568 |
| 6,503,438 B2 | 1/2003 | Beaumont et al. | |
| 6,524,093 B2 | 2/2003 | Bouti | |
| 6,561,790 B2 | 5/2003 | Blais et al. | |
| 2001/0026819 A1 * | 10/2001 | Gould et al. ................. | 425/572 |

FOREIGN PATENT DOCUMENTS

| | | | | |
|---|---|---|---|---|
| DE | 33 38 783 C1 | 3/1995 | | |
| EP | 0 480 223 A1 | 4/1992 | | |
| EP | 0 491 300 A2 | 6/1992 | | |
| EP | 0 845 345 | 6/1998 | ........... | B29C/45/27 |
| EP | 0 875 355 A1 | 11/1998 | ........... | B29C/45/27 |

* cited by examiner

Primary Examiner—Tim Heitbrink
(74) Attorney, Agent, or Firm—Sterne, Kessler, Goldstein & Fox P.L.L.C.

(57) ABSTRACT

A guide for a manifold plug of an injection molding apparatus comprises a guide body projecting from an inner wall of the manifold plug diametrically opposing an inlet of a manifold plug channel formed in the manifold plug. The inlet is aligned with a manifold channel of a manifold. The outlet of the manifold plug channel is aligned with a nozzle channel of a nozzle. The inlet is at an angle to the outlet. A guide surface is provided on the guide body for abutting a downstream portion of a valve pin extending into the manifold plug channel. The guide also facilitates flow of a melt stream of moldable material through the manifold plug channel.

12 Claims, 15 Drawing Sheets

INJECTION MANIFOLD HAVING A VALVE PIN GUIDING DEVICE

FIELD OF THE INVENTION

The present invention relates generally to an injection molding apparatus, and in particular to a manifold having a valve pin guiding device that acts as a flow restriction.

BACKGROUND OF THE INVENTION

Manifold plugs or inserts for manifolds are well known in the injection molding industry. In applications that require the use of a movable pin to regulate the flow of a molten material, these manifold plugs are also referred to as valve pin bushings. During injection molding, the manifold plug receives a melt stream of moldable material from a manifold and delivers the melt stream to a nozzle via a manifold plug channel provided in the manifold plug. The manifold plug channel is typically elbow shaped. As a result, the melt stream must follow an approximately 90 degree bend between the inlet of the manifold plug channel and the outlet thereof. Reference is made in this regard to U.S. Pat. No. 4,017,242; U.S. Pat. No. 4,299,553; U.S. Pat. No. 4,609,138; U.S. Pat. No. 5,295,806; U.S. Pat. No. 5,366,369; U.S. Pat. No. 5,441,197; U.S. Pat. No. 5,762,976; U.S. Pat. No. 5,955,121; U.S. Pat. No. 6,007,108; European Patent Document No. 0 845 345; and European Patent Document No. 0 875 355.

In the case of an injection molding apparatus having a valve pin operated to control the melt stream flow through the manifold or a hot runner nozzle, the manifold includes a bore that extends therethrough to accommodate the valve pin. In some cases, the bore is located in the manifold plug or insert. The valve pin is actuated by a valve piston, or by any other appropriate mechanical or electrical device. The actuation device is typically located above the manifold bore and the valve pin is slidable through the manifold or the manifold plug bore. As the melt stream flows through the manifold channel or manifold plug channel, a continuous force is applied to the valve pin. The direction of the force is generally perpendicular to the longitudinal axis of the valve pin, and therefore the valve pin experiences bending stresses as a result.

Extending a valve pin through a manifold or a manifold plug causes a dead spot or pin shadow to be formed behind and/or downstream of the valve pin, between the valve pin and the inner wall of the manifold channel or manifold plug channel. A dead spot is a location where moldable material from the melt stream slows down and becomes trapped. This area therefore has a stagnant flow pattern, which affects the performance of the manifold. Dead spots are undesirable particularly for color change applications because the number of cycles required to flush out the old color is increased.

U.S. Pat. No. 5,374,182 to Gessner discloses a hot runner manifold bushing that does not accommodate for the formation of dead spots behind the valve pin. Reference is also made to U.S. Pat. No. 3,716,318; U.S. Pat. No. 4,781,572; U.S. Pat. No. 4,932,858; and U.S. Pat. No. 5,811,140 that teach various valve bushing designs.

It is therefore an object of the present invention to provide a restriction or a guide for a manifold or manifold plug channel, which obviates or mitigates the above disadvantages.

SUMMARY OF THE INVENTION

According to one aspect of the present invention there is provided An injection molding apparatus comprising:

a manifold having a manifold channel for receiving a melt stream of moldable material under pressure;

a manifold plug provided in said manifold, said manifold plug having a manifold plug channel formed therein, said manifold plug channel having an inlet receiving the melt stream from said manifold channel and an outlet delivering the melt stream to a nozzle channel of a nozzle, said manifold plug channel undergoing a change in direction between said inlet and outlet;

a mold cavity receiving said melt stream from said nozzle, said nozzle channel communicating with said mold cavity through a mold gate;

a valve pin passing through a bore provided in said manifold plug and extending into said manifold plug channel and said nozzle channel, said valve pin being movable to selectively open and close said mold gate; and a guide projecting from an inner wall of said manifold plug channel, diametrically opposing said inlet, said guide being located behind said valve pin and abutting a portion of said valve pin.

According to another aspect of the present invention there is provided a manifold plug comprising:

a manifold plug body including a manifold plug channel having an inlet and an outlet formed therein;

a guide body projecting from an inner wall of said manifold plug body diametrically opposing said inlet, said inlet for aligning with a manifold channel of a manifold and said outlet for aligning with a nozzle channel of a nozzle, said inlet being at an angle to said outlet; and a guide surface provided on said guide body, said guide surface abutting a downstream portion of a valve pin extending through said manifold plug body.

According to yet another aspect of the present invention there is provided an injection molding apparatus comprising:

a manifold having a manifold channel for receiving a melt stream of moldable material under pressure and delivering said melt stream to a nozzle, said manifold channel undergoing a change of direction from an inlet to an outlet and being aligned with a nozzle channel of said nozzle;

a mold cavity for receiving said melt stream from said nozzle, said nozzle channel communicating with said mold cavity through a mold gate;

a valve pin extending through a bore provided in said manifold and through said nozzle channel, said valve pin being movable to selectively open and close said mold gate;

a guide projecting from an inner wall of said manifold channel, said guide being integrally formed with the inner wall of said manifold channel and diametrically opposing said inlet for facilitating flow of said melt stream, said guide being located behind said valve pin and abutting a portion of said valve pin.

The present invention provides advantages in that the occurrence of dead spots behind the valve pin is reduced and the valve pin is provided with additional support and guidance so that it is less susceptible to bending.

BRIEF DESCRIPTION OF THE DRAWINGS

Embodiments of the present invention will now be described more fully with reference to the accompanying drawings in which:

FIG. 3b is a top view of the prior art manifold plug of FIG. 3a;

DETAILED DESCRIPTION OF THE PREFERRED EMBODIMENT

Figure 1:
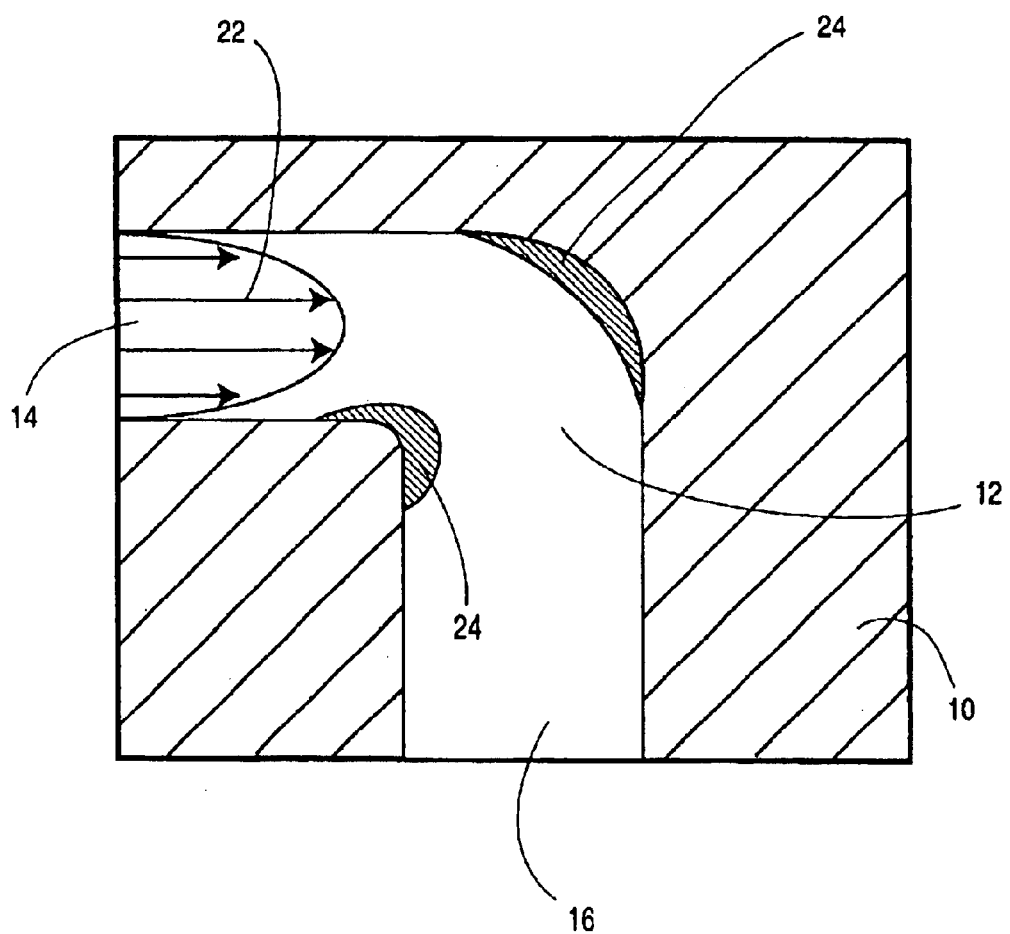
FIG. 1 is a side sectional view of a portion of a prior art manifold.

Referring now to FIG. 1, a portion of a prior art manifold 10 is shown having a manifold melt channel 12 extending therethrough. The manifold melt channel 12 is curved and includes an inlet 14 and an outlet 16. The inlet 14 and the outlet 16 extend at an angle of approximately 90 degrees to one another and are joined together by a curved elbow portion 20. Other angles can be used depending on the molding conditions, such as pressure and viscosity of the molten material. The inlet 14 and outlet 16 of the manifold melt channel 12 have generally equal diameters. A velocity profile 22 is shown in the figure to illustrate that the velocity of the melt stream of moldable material travelling along the manifold melt channel is higher near the centre of the manifold melt channel 12. The areas of the manifold melt channel 12 that are indicated by reference numeral 24 designate areas of stagnant flow.

Figure 2A:
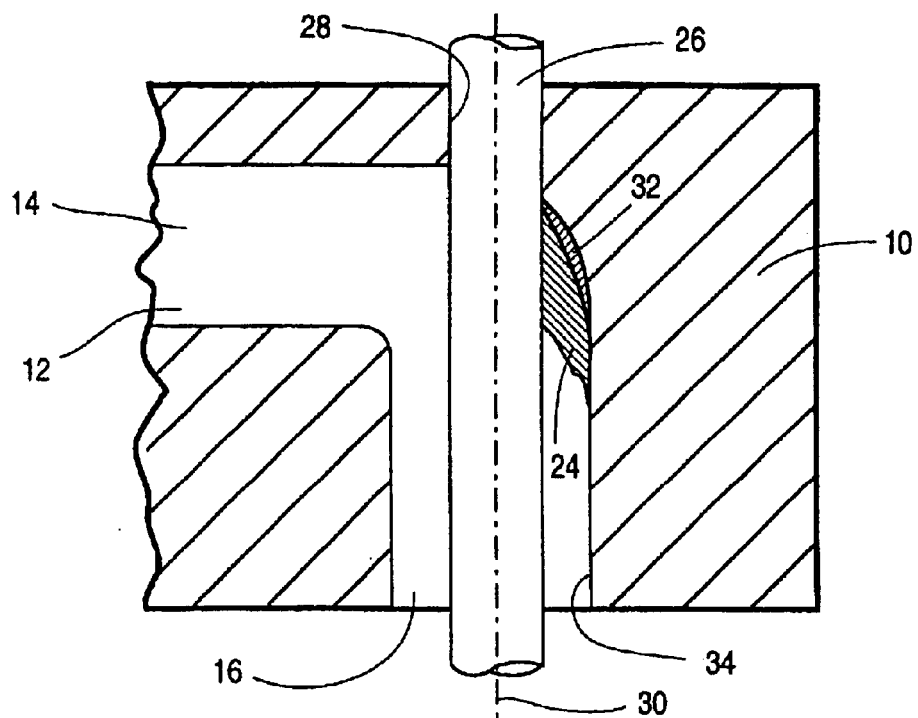
FIG. 2a is a side sectional view of a portion of a prior art manifold accommodating a valve pin.

FIG. 2a shows a prior art manifold 10 that includes a valve pin 26 extending through a bore 28 provided in the manifold. The valve pin 26 is aligned with a central axis 30 of the outlet 16. The inclusion of the valve pin 26 within the manifold melt channel 12 causes a dead spot 32 to be formed between an inner wall 34 of the manifold melt channel 12 and the stagnant flow area 24. There is little or no movement of melt stream at the dead spot 32.

The viscosity of molten plastic materials changes with shear rate. A fluid with a viscosity, which is dependent on shear rate is called non-Newtonian. In this case, the viscosity of the fluid molten plastic decreases as the shear rate increases. In an injection molding system, directional change in the flow channel will effect the velocity of the melt stream within the nozzle. The cross-sectional area of the flow channel changes as it goes around a corner, even when the melt channel remains at the same size. The melt stream at the outer side of the bend must travel a longer distance than the melt stream at the inner side of the bend. In addition, the larger cross-section at the bend leaves a large volume of stagnant material that is difficult to clean out.

The addition of a valve pin in the cross runner adds additional friction to the melt stream, flow, further slowing down the melt stream at the outer side of the melt channel. This is known in the industry as a pin shadow.

Figure 2B:
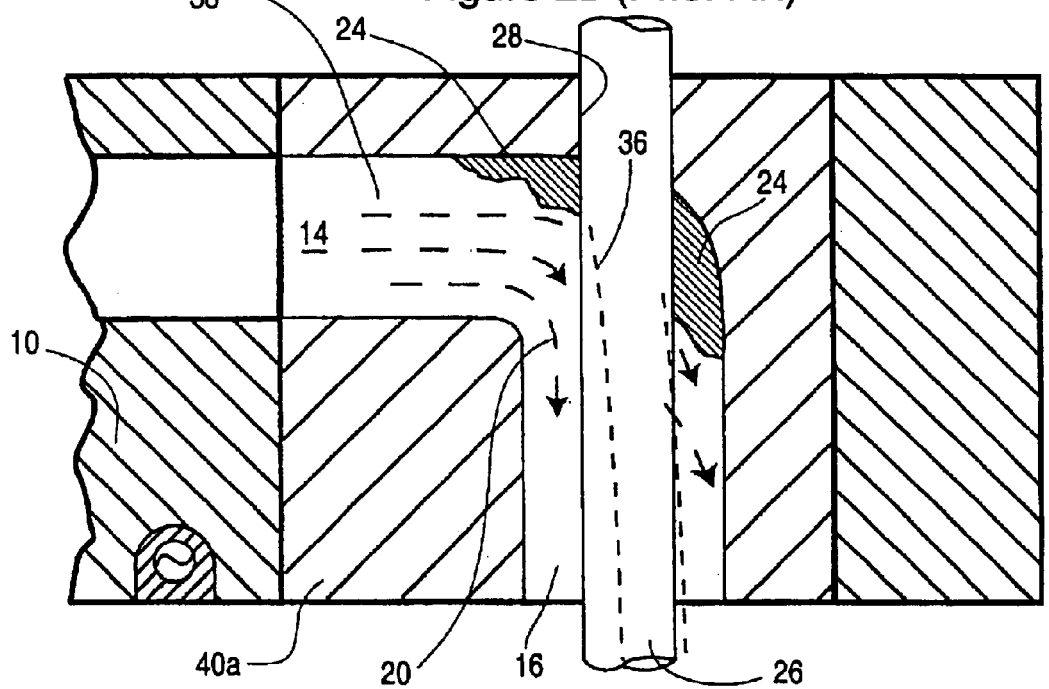
FIG. 2b is a side sectional view of a portion of a prior art manifold accommodating a valve pin and a manifold plug.
Figure 3A:
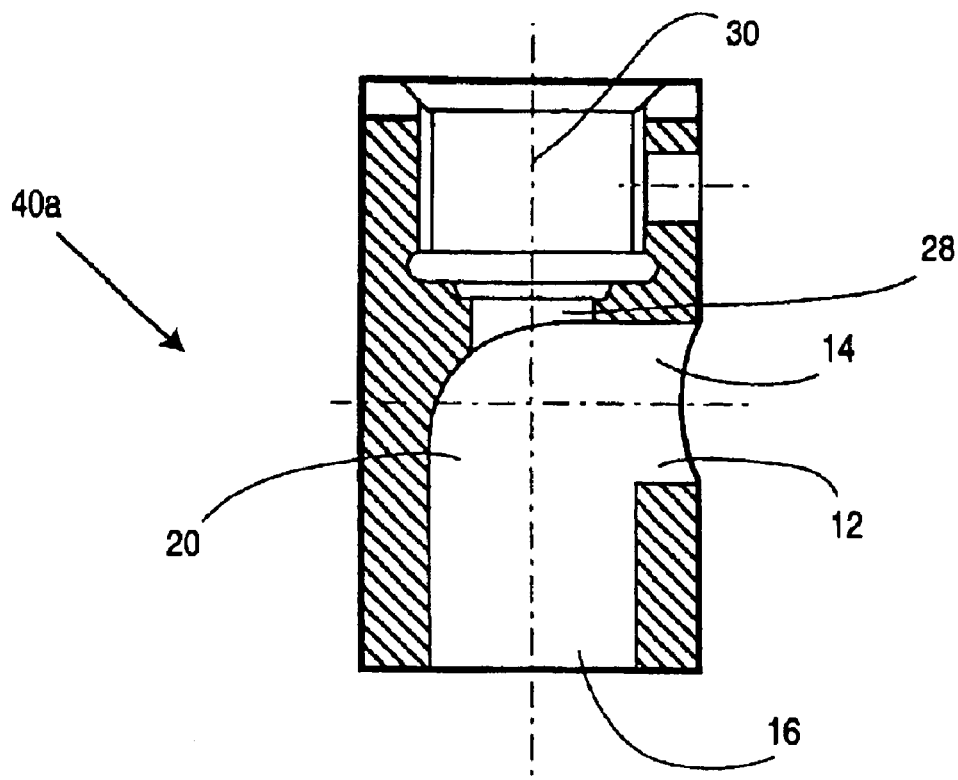
FIG. 3a is a side sectional view of a prior art manifold plug.
Figure 3B:
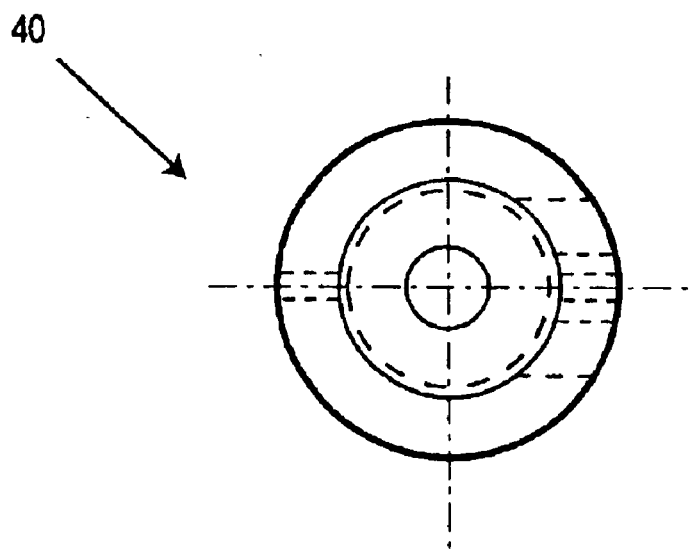

Referring to FIG. 2b, a manifold 10 accommodating a manifold plug 40a of the prior art is shown. The manifold plug 40a includes a manifold plug channel 38 having an inlet 14, an outlet 16 and a curved elbow portion 20 similar to those shown in the previous figures. The arrows in FIG. 2b represent the melt stream of moldable material. As shown by the arrows, the melt stream applies a force to the valve pin 26, which may cause the valve pin 26 to bend into a position indicated by dashed lines 36. Another prior art manifold plug 40a is shown in FIGS. 3a and 3b. This manifold plug 40a is applicable for valve pin solutions.

As will be apparent from the above discussion of prior art manifolds and manifold plugs with reference to FIGS. 1 to 3b, the addition of a valve pin into the manifold or manifold plug of an injection molding apparatus causes dead spots to occur behind the valve pin and causes the valve pin to experience bending stresses.

Figure 4:
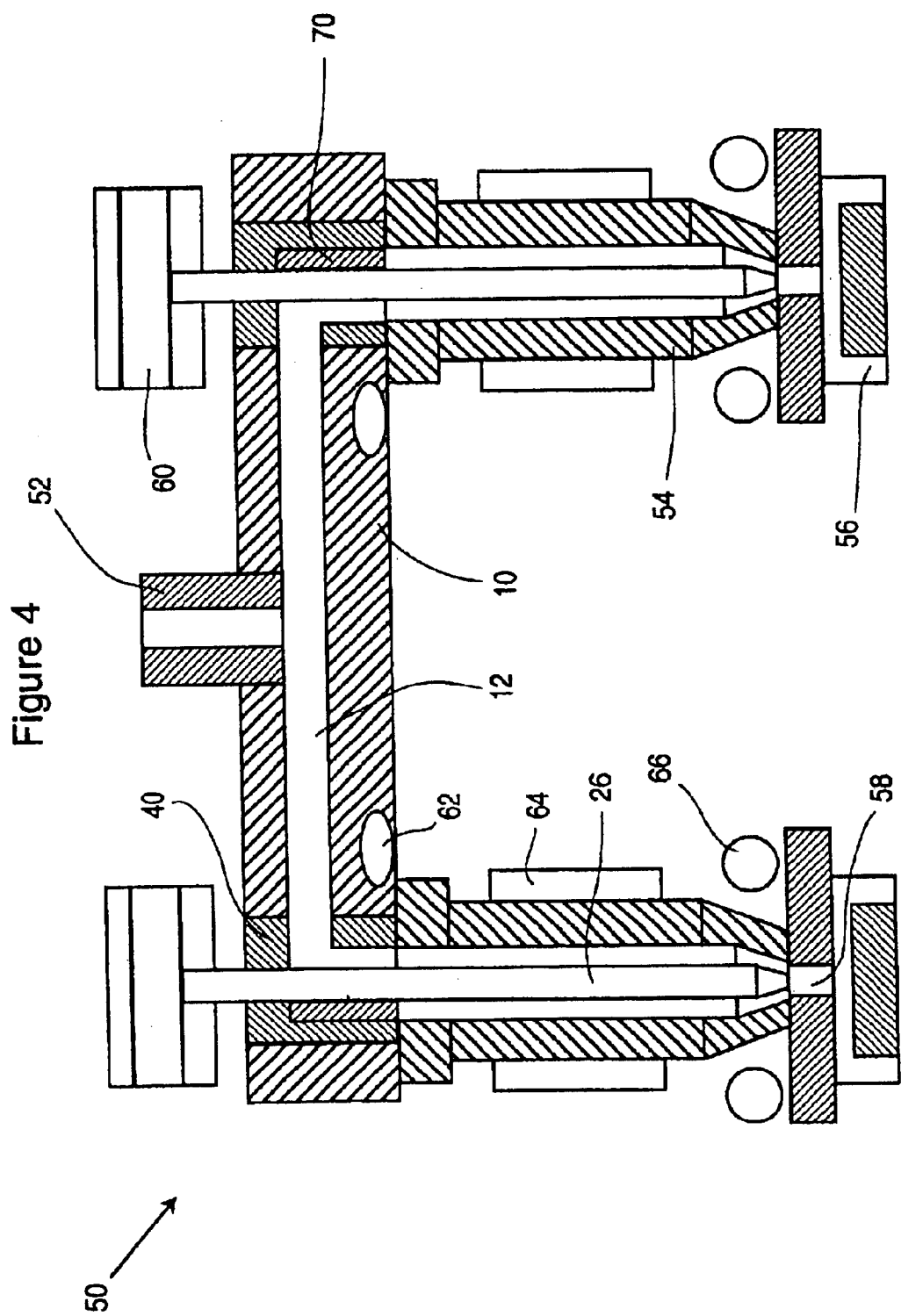
FIG. 4 is a side sectional view of an injection molding apparatus with a manifold plug having a guide in accordance with the present invention.

Now that the operation of manifolds and manifold plugs of the prior art has been explained, reference to FIG. 4 will now be made, in which an injection molding apparatus 50 is generally shown. The injection molding apparatus 50 comprises two nozzles 54 that extend from a manifold 10. The nozzles 54 are in communication with the manifold melt channel 12 of the manifold 10 and receive a melt stream of moldable material under pressure therefrom. A mold gate 58 is located adjacent the tip of each nozzle 54. The mold gate 58 is openable to allow delivery of the melt stream to a mold cavity 56. A valve pin 26 extends through the length of each nozzle 54 and is movable by a valve piston 60 to open and close the mold gate 58. The melt stream of moldable material is delivered to the manifold 10 through a manifold bushing 52. Any number of nozzles 54 can be used to feed either a single or a plurality of mold cavities 56. Manifold heaters 62 and nozzle heaters 64 maintain the melt stream at a desired temperature and cooling channels 66 facilitate cooling of the mold cavities 56.

Figure 5:
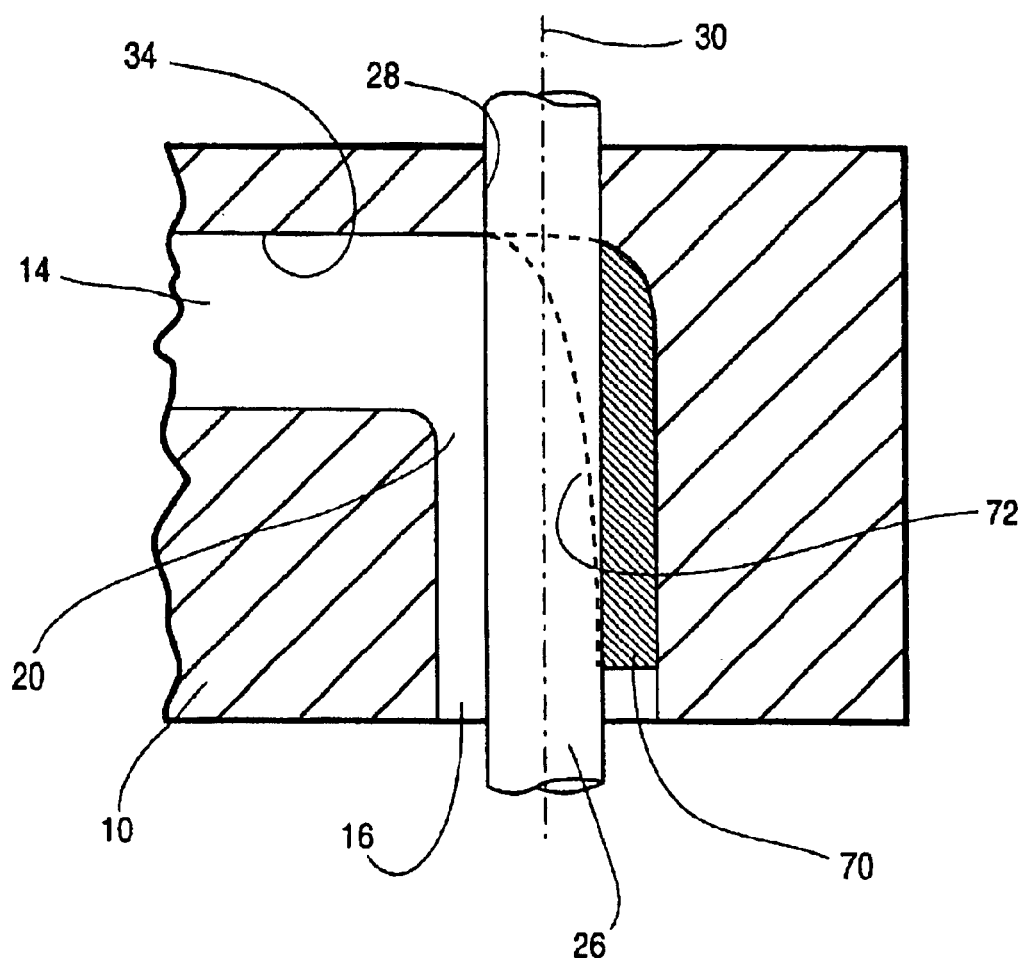
FIG. 5 is a side sectional view of a portion of a manifold accommodating a valve pin and having a guide in accordance with the present invention.
Figure 6:
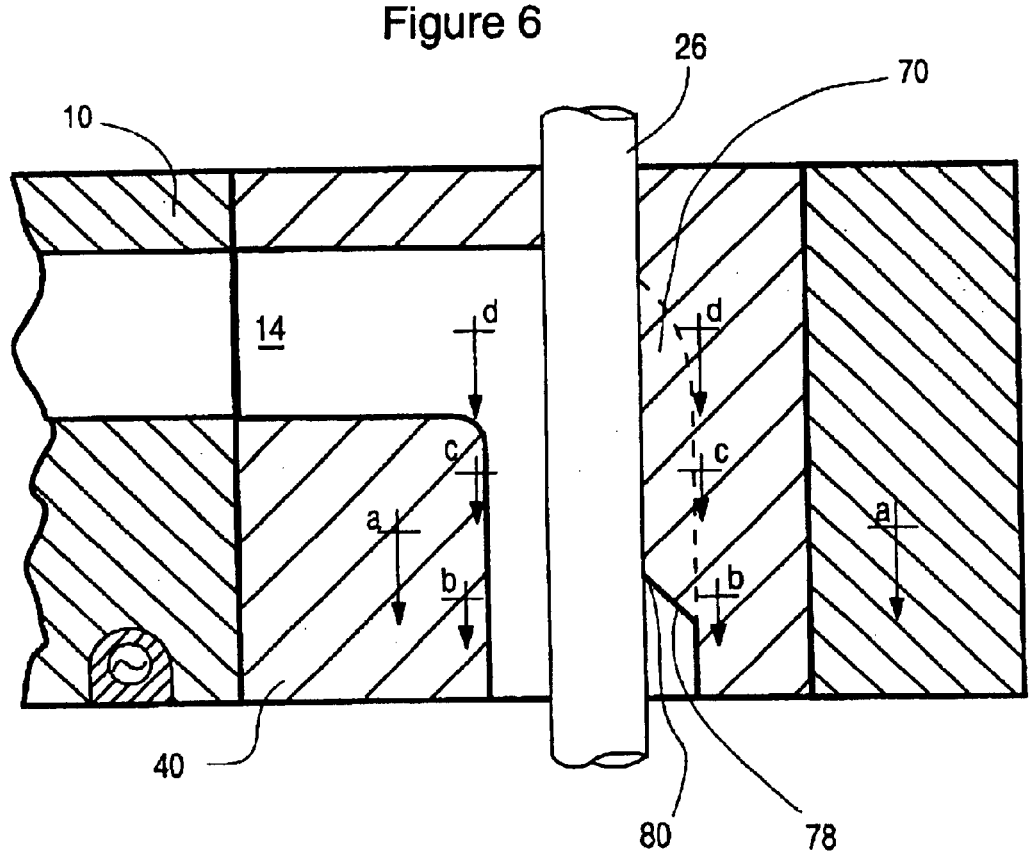
FIG. 6 is a side sectional view of a portion of a manifold accommodating a valve pin and a manifold plug having a guide in accordance with the present invention.
Figure 7:
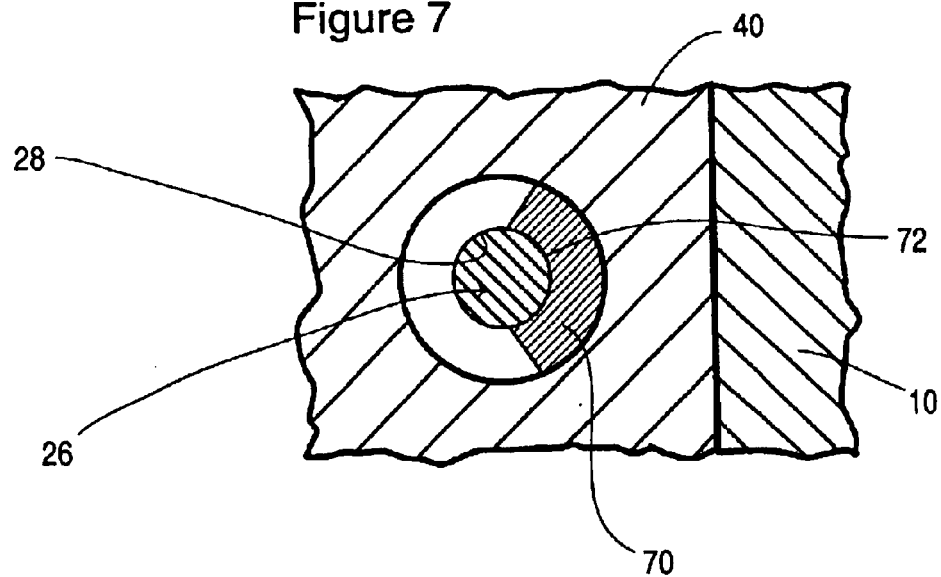
FIG. 7 is a view on a—a of FIG. 6.

The injection molding apparatus 50 further comprises manifold plugs 40 that are inserted adjacent the distal ends of the manifold 10. Each manifold plug 40 includes a melt flow restriction element or guide 70 projecting from the inner surface of the manifold plug channel at a location that is diametrically opposed to the inlet. It will be appreciated by a person skilled in the art that the guide 70 may be provided directly in a manifold 10, as shown in FIG. 5. The ability to provide the guide 70 in the manifold depends on the technique used to make the manifold and the melt channel.

FIG. 5 shows a valve pin 26 that is slidable through the manifold 10 along axis 30. Walls of the bore 28 provide a bushing for the valve pin 26. The bore 28 is sized to form a seal between the valve pin 26 and the manifold plug 40 so that moldable material does not escape through the bore 28.

Figure 8:
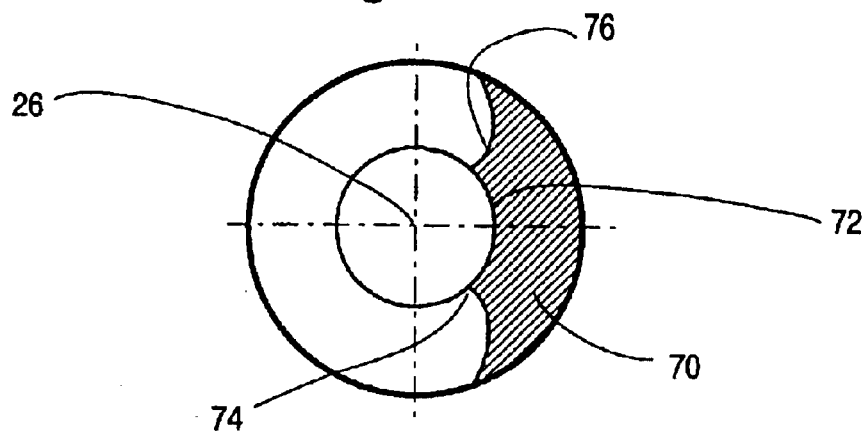
FIG. 8 is a view on b—b of FIG. 6.

The manifold 10 of FIG. 5 includes the flow restriction element or guide 70. Similar to the guide 70 in FIG. 4, the guide projects into the manifold melt channel 12. The guide 70 includes a curved guide surface 72, which abuts the valve pin 26. The guide surface 72 is surrounded by a guide edge 74, as shown in FIG. 8. Referring now to FIGS. 6–10, the guide 70 is better illustrated. Guide 70 is integrally formed with an inner wall of the manifold melt channel 12. Although the guide 70 shown in FIGS. 6–10 is located on the manifold plug 40, it will be appreciated that the guide has the same structure as the guide 70 of FIG. 5.

Figure 9:
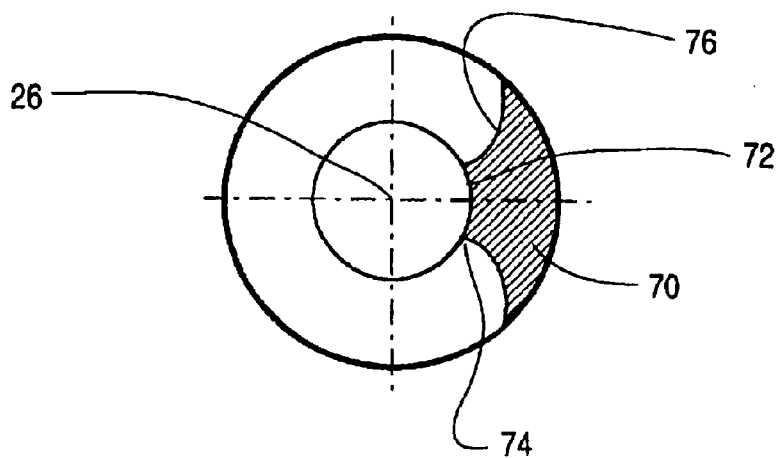
FIG. 9 is a view on c—c of FIG. 6.
Figure 10:
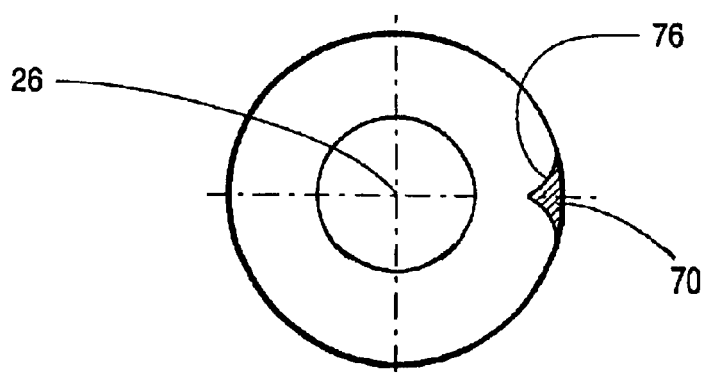
FIG. 10 is a view on d—d of FIG. 6.

The guide 70 has several functions. It reduces the cross-sectional area of the channel gradually at the bend by filling in the area behind the valve pin 26 where the melt stream is moving slowly along the outer side of the channel bend. This is shown in FIGS. 8–10. This results in an increase in the velocity of the melt stream as it goes around the bend in the melt channel during the directional change. The shape of the guide 70 is such that the area filled by the guide is gradually reduced until the melt stream completely surrounds the valve pin 26.

As shown in FIGS. 6–10, the guide 70 fills the space between the valve pin 26 and the area of the inner wall 34 that is located behind the valve pin 26, and thus, substantially eliminates the dead spot discussed earlier in relation to FIG. 2a. The curved guide surface 72 abuts a downstream portion of the valve pin 26 to provide support for the valve pin 26 and inhibit moldable material from becoming lodged behind the valve pin 26.

Figure 11:
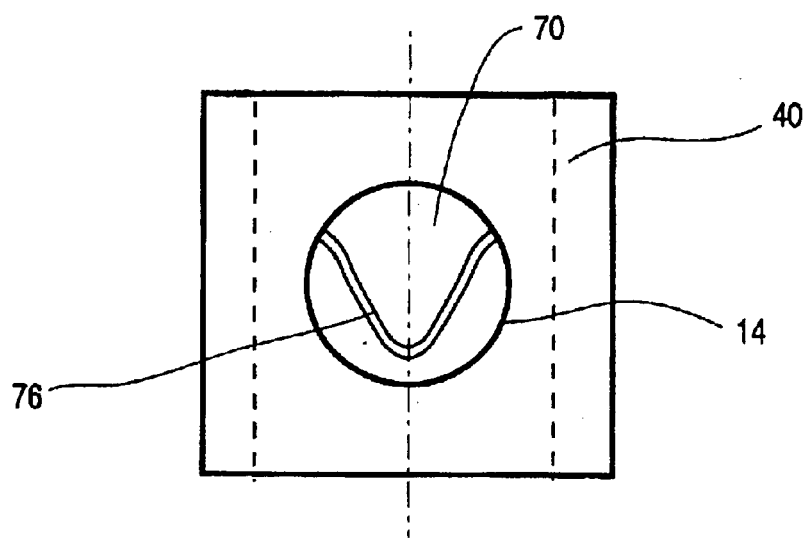
FIG. 11 is a front view of the manifold plug of FIG. 6.
Figure 12:
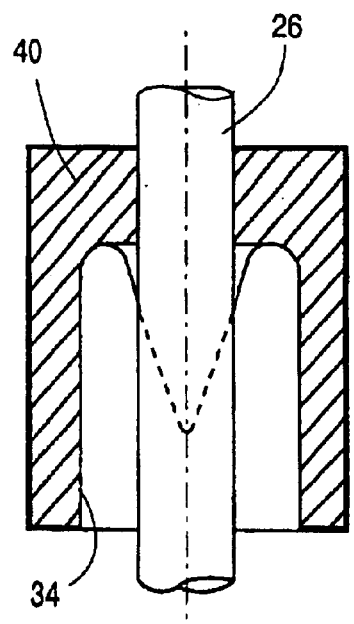
FIG. 12 is a front sectional view of the manifold plug of FIG. 11 including a portion of a valve pin.
Figure 13:
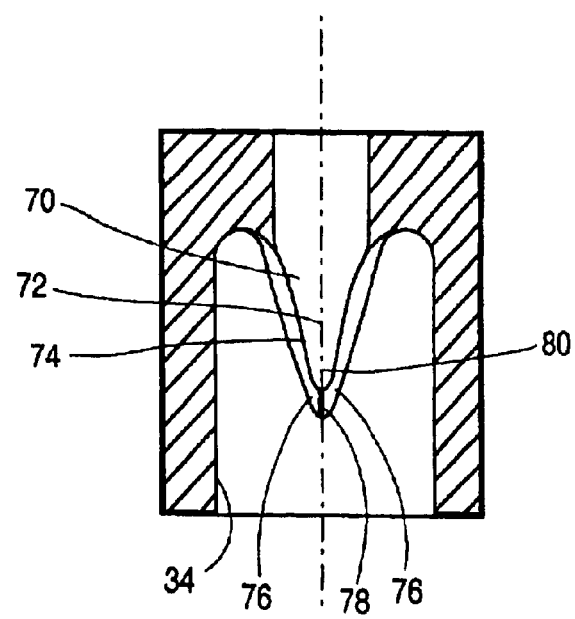
FIG. 13 is a front sectional view of the manifold plug of FIG. 11 with the valve pin removed.
Figure 14:
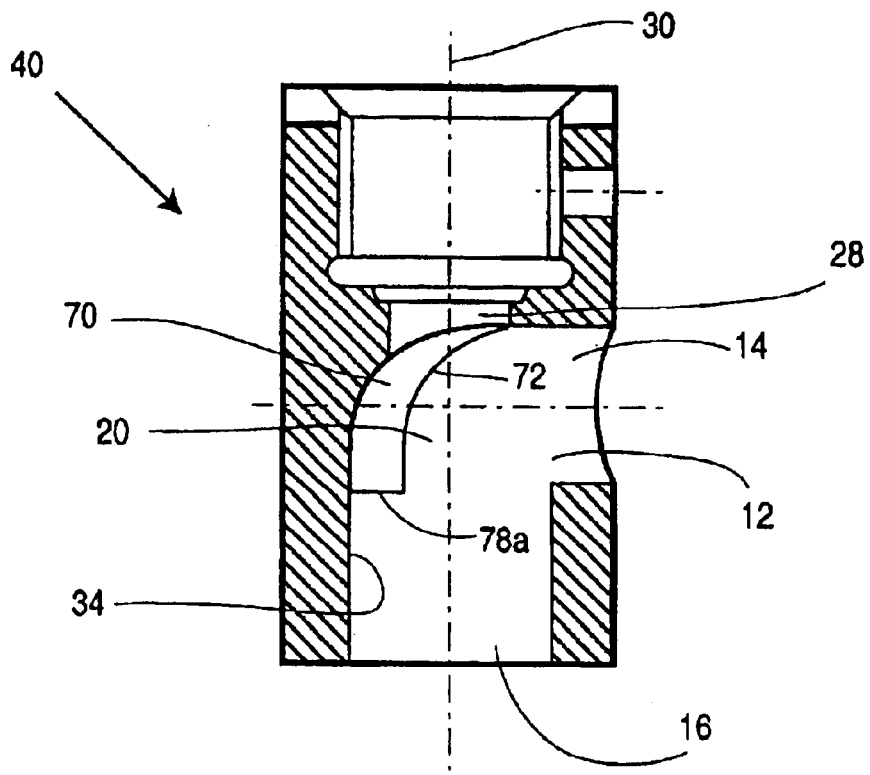
FIG. 14 is a side view, partly in section, of yet another embodiment of a manifold plug having a guide in accordance with the present invention.
Figure 15:
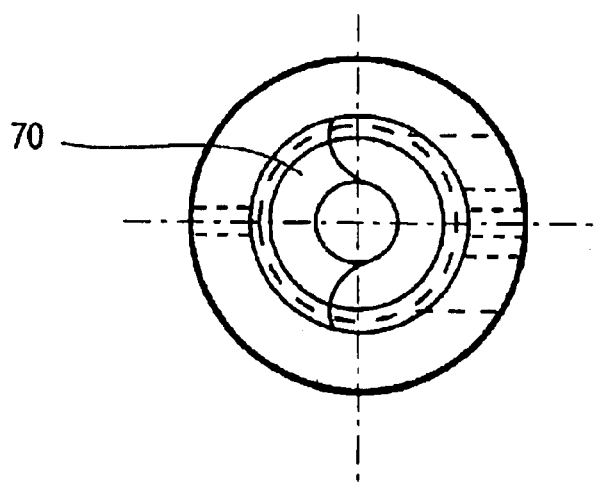
FIG. 15 is a top view of the manifold plug of FIG. 14.
Figure 16:
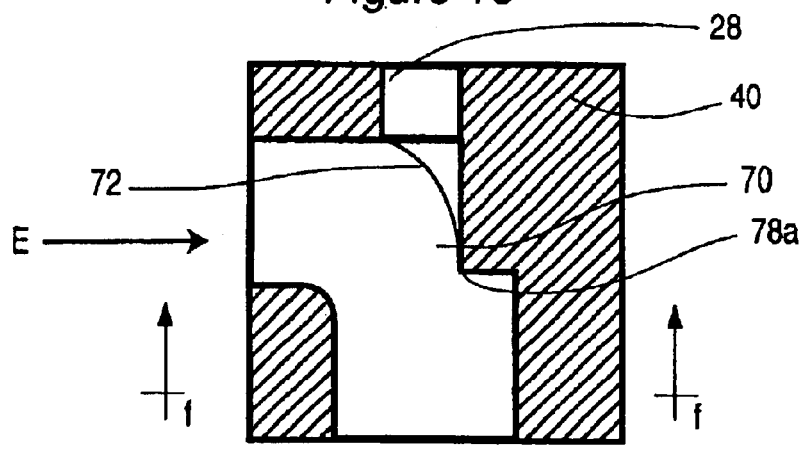
FIG. 16 is another side sectional view of the manifold plug of FIG. 14.
Figure 17:
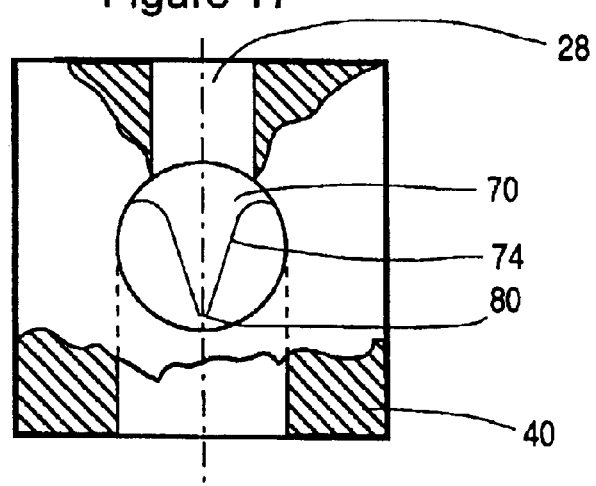
FIG. 17 is a view on E, partly in section of the manifold plug of FIG. 16.
Figure 18:
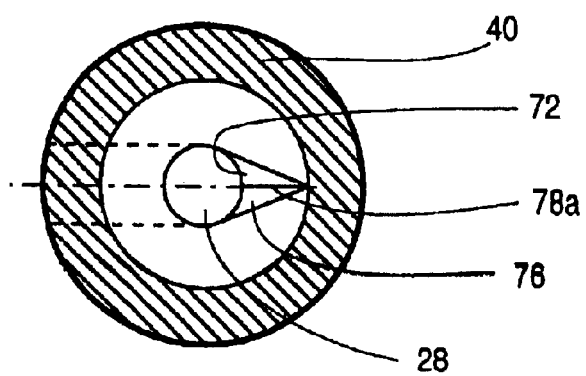
FIG. 18 is a view on f—f of the manifold plug of FIG. 16.

As can been seen in FIGS. 11–13, the guide 70 further comprises a pair of faces 76 that taper outwardly from the guide edge 74 towards the inner wall 34. The faces 76 meet to form a ridge 78 that tapers from a point 80, located at the end of the guide surface 72 that is furthest downstream, towards the inner wall 34. The faces 76 are integral with the inner wall 34 in order to provide a smooth transition between the inner wall 34 and the guide edge 74. The smooth transition provided by faces 76 ensures that the flow of the melt stream is not disrupted as it passes through the manifold plug 40.

Referring to FIGS. 14 to 18, another embodiment of a manifold plug 40 having a guide 70 in accordance with the present invention is shown. In this and other embodiments that follow, like numerals will be used to represent like parts. The guide 70 is generally the same as that described above. However, in this embodiment, the guide 70 does not include the tapered ridge 78. The ridge 78a of this embodiment extends generally at a right angle between the guide surface 72 and the inner wall 34.

Figure 19:
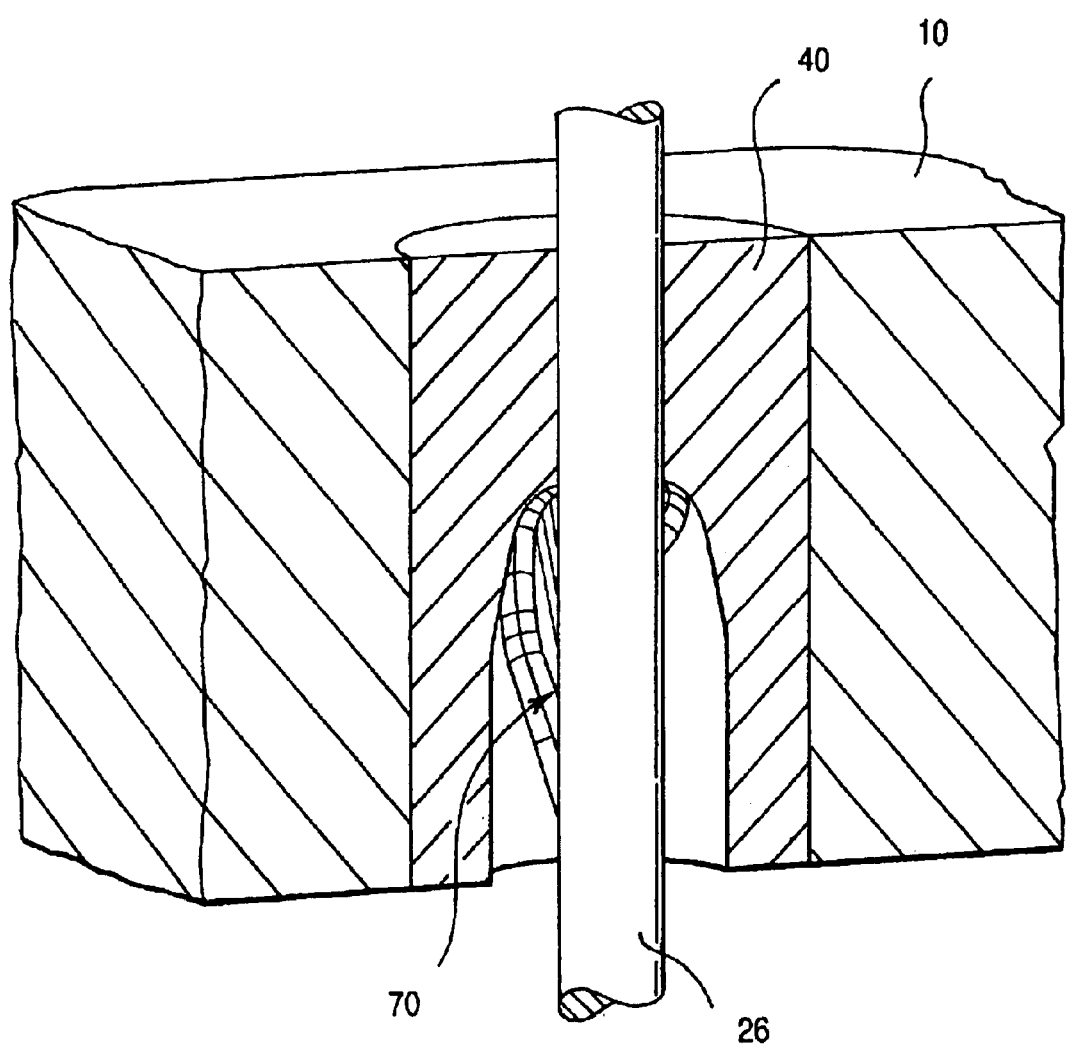
FIG. 19 is an isometric view of a portion of a manifold, a valve pin and a manifold plug having a guide in accordance with the present invention.
Figure 20:
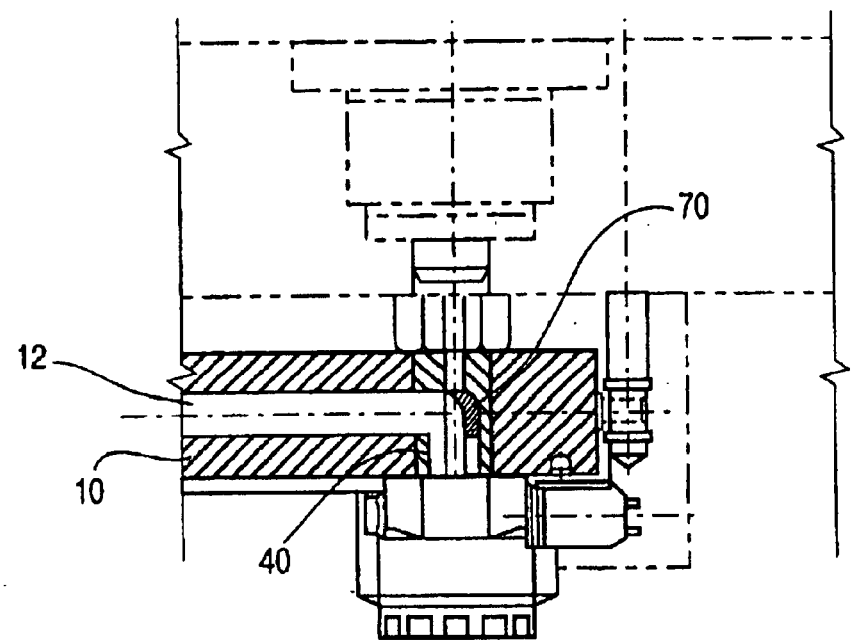
FIG. 20 is a portion of an injection molding apparatus including a manifold plug having a guide in accordance with the present invention.
Figure 21:
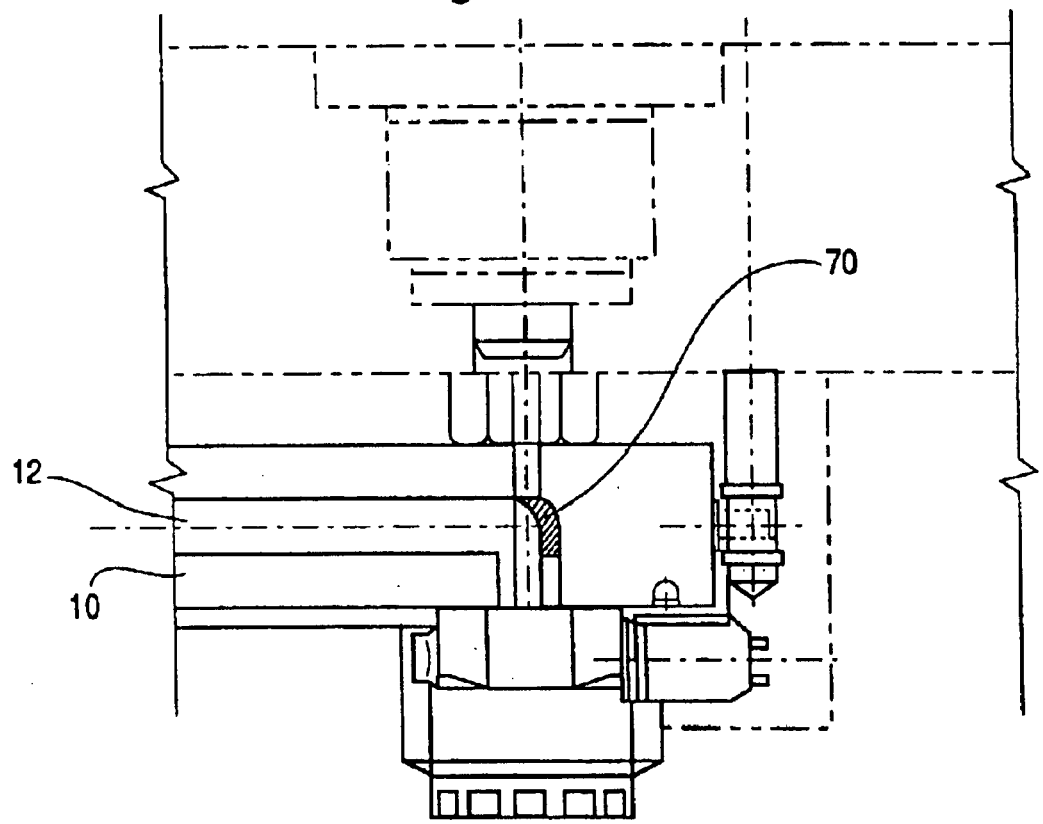
FIG. 21 is a side sectional view of a portion of an injection molding apparatus including a manifold having a guide in accordance with the present invention.

FIG. 19 also shows a manifold plug 40 having a guide 70 inserted into a manifold 10. As previously discussed, the guide 70 can be provided in a manifold plug 40 or in a manifold 10. FIG. 20 shows the guide 70 of FIGS. 14 to 18 located in a manifold plug 40. FIG. 21 shows the guide 70 of FIGS. 14 to 18 located in a manifold 10.

Figure 22:
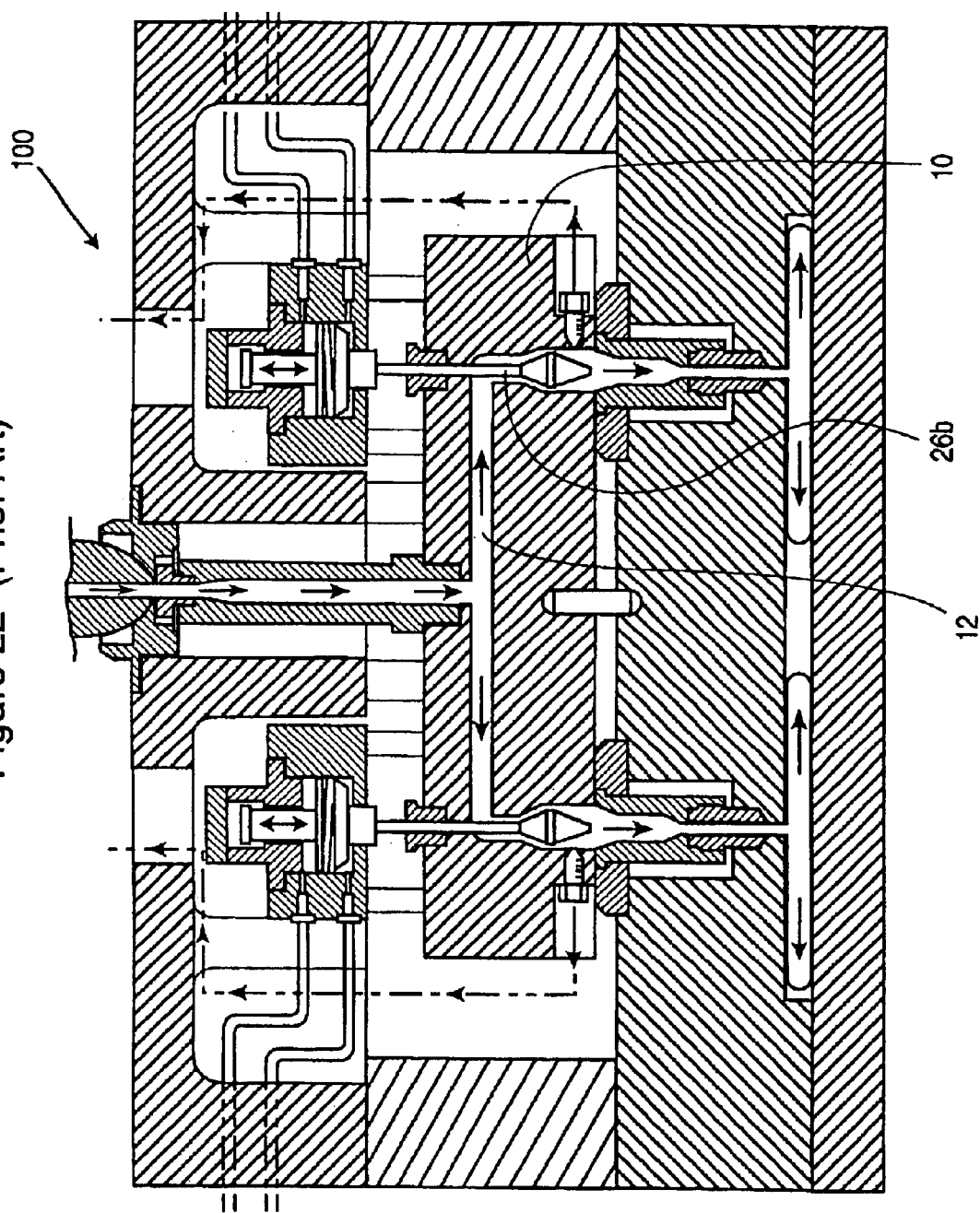
FIG. 22 is a sectional view of a prior art dynamic feed injection molding system.

Referring now to FIG. 22, a prior art dynamic feed injection molding system 100 is generally shown. This injection molding system is disclosed in U.S. Pat. No. 6,309,208 to Kazmer et al., issued on Oct. 30, 2001, the contents of which are herein incorporated by reference. The system 100 includes a valve pin 26b that is movable axially in a manifold 10.

Figure 23:
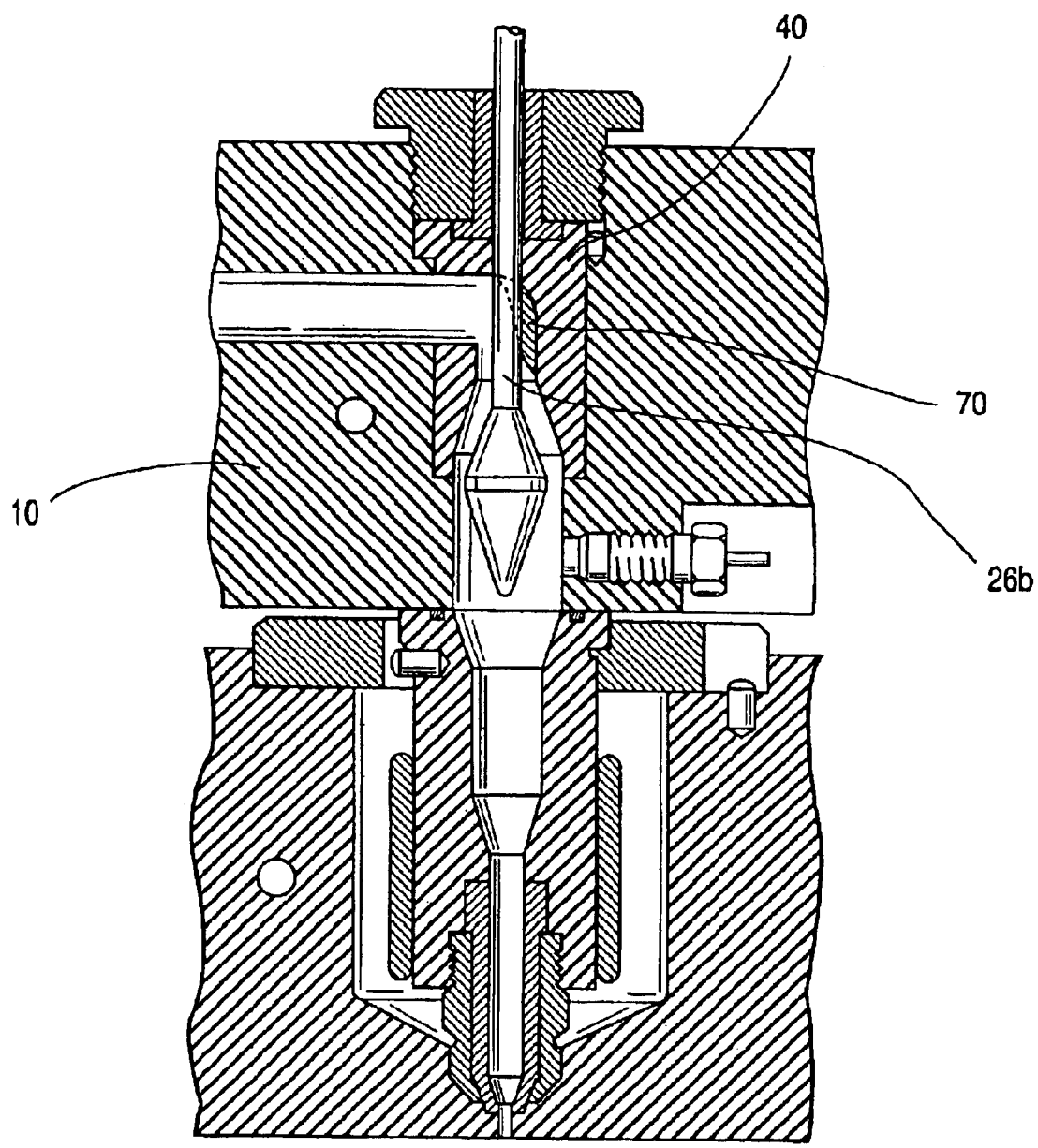
FIG. 23 is a sectional view of a portion of a dynamic feed injection molding system with a manifold plug having a guide in accordance with the present invention.

FIG. 23 shows a portion of the dynamic feed injection molding system 100 that has been modified to include the guide 70 of the present invention and thereby reduce valve pin bending and facilitate the flow of the melt stream. In this system, the valve pin 26b regulates the flow of moldable material through the manifold, providing more or less moldable material to a thermal gating hot runner nozzle. The guide 70 of FIGS. 6 to 10 is shown; however, the guide 70 of FIGS. 14 to 18 may also be used.

Figure 24:
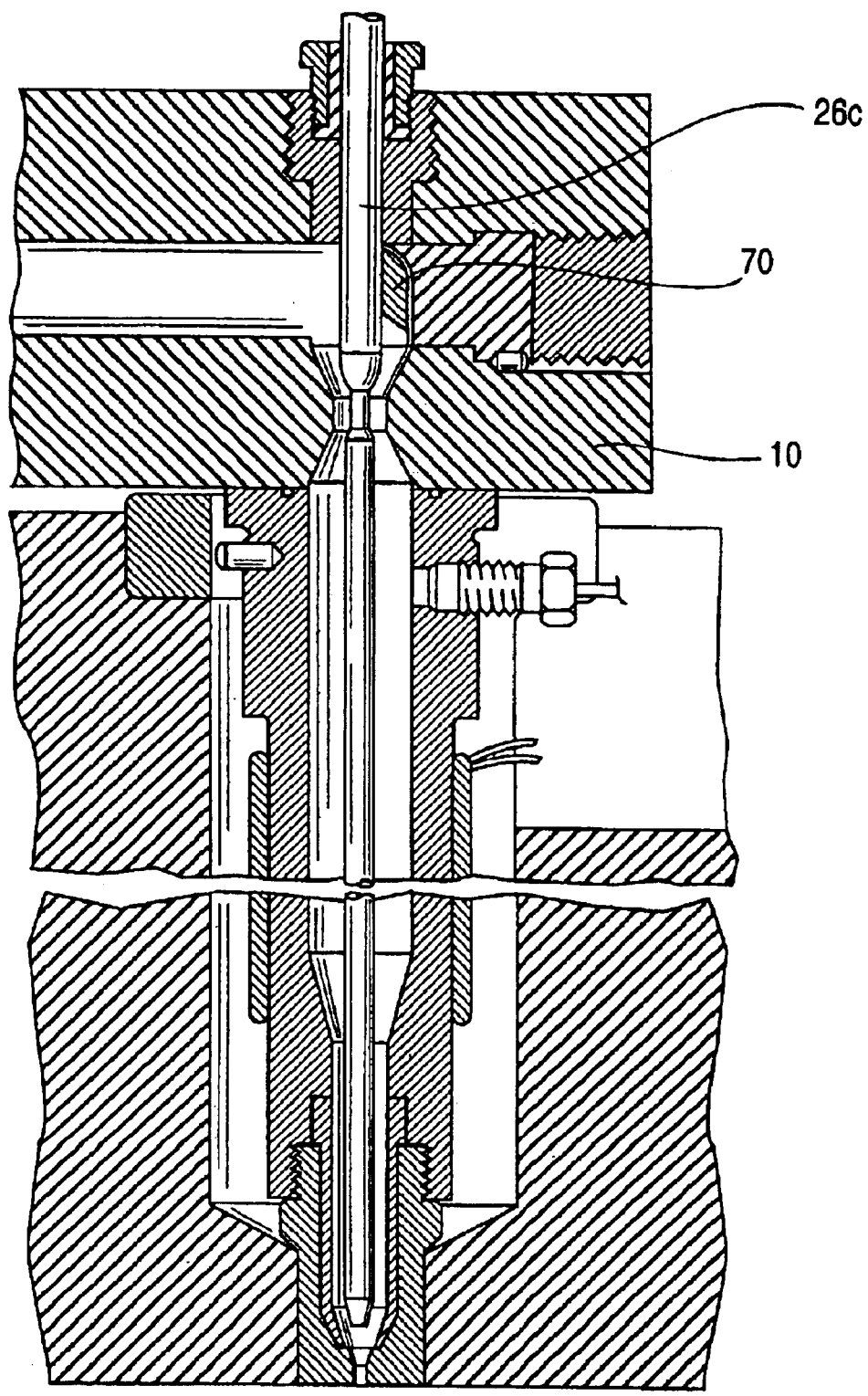
FIG. 24 is a sectional view of a portion of another dynamic feed injection molding system with a manifold plug having a guide in accordance with the present invention.

FIG. 24 shows a portion of another dynamic feed injection molding system. In this system, the valve pin 26c regulates the flow of moldable material through the manifold and through the mold gate, providing more or less material to a valve gate hot runner nozzle. The guide 70 of the preferred embodiment is shown, however, the guide 70 of FIGS. 14 to 18 may also be used.

It will be appreciated by a person skilled in the art that the guide 70 of the present invention may be used at any location where a channel undergoes a change of direction and a valve pin extends through an outlet of the channel. Other applications for the guide include nozzles in which the flow enters the nozzle at an angle to the valve pin.

Although preferred embodiments of the present invention have been described, those of skill in the art will appreciate that variations and modifications may be made without departing from the spirit and scope thereof as defined by the appended claims.

We claim:

1. An injection molding apparatus comprising:
   a manifold having a manifold channel for receiving a melt stream of moldable material under pressure;
   a manifold plug provided in said manifold, said manifold plug having a manifold plug channel formed therein, said manifold plug channel having an inlet receiving the melt stream from said manifold channel and an outlet delivering the melt stream to a nozzle channel of a nozzle, said manifold plug channel undergoing a change in direction between said inlet and outlet;
   a mold cavity receiving said melt stream from said nozzle, said nozzle communicating with said mold cavity through a mold gate;
   a valve pin passing through a bore provided in said manifold plug and extending into said manifold plug channel and said nozzle channel, said valve pin being movable to selectively open and close said mold gate; and
   a guide projecting from an inner wall of said manifold plug channel, diametrically opposing said inlet, said guide being located behind said valve pin and abutting a portion of said valve pin.

2. An injection molding apparatus as claimed in claim 1, wherein said guide provides a restriction to the flow of said melt stream.

3. An injection molding apparatus as claimed in claim 2, wherein said guide is integrally formed with the inner wall of said manifold plug channel.

4. An injection molding apparatus as claimed in claim 3, wherein said guide presents a guide surface extending towards said outlet between a lower edge of said bore and a predetermined location on an inner surface of said manifold plug channel.

5. An injection molding apparatus as claimed in claim 4, wherein said inner wall tapers towards said guide surface to form a smooth transition between said inner wall and an edge of said guide surface.

6. An injection molding apparatus as claimed in claim 5, wherein said guide surface tapers to a point in a direction away from said bore.

7. An injection molding manifold plug comprising:
a manifold plug body including a manifold plug channel having an inlet and an outlet formed therein;
a guide body projecting from an inner wall of said manifold plug body and diametrically opposing said inlet, said inlet for aligning with a manifold channel of a manifold and said outlet for aligning with a nozzle channel of a nozzle, said inlet being at an angle to said outlet; and
a guide surface provided on said guide body, said guide surface abutting a downstream portion of a valve pin extending through said manifold plug body.

8. An injection molding manifold plug as claimed in claim 7, wherein said guide facilitates flow of a melt stream of moldable material through said manifold plug channel between said inlet and outlet.

9. An injection molding manifold plug as claimed in claim 8, wherein said guide is integrally formed with said inner wall.

10. An injection molding apparatus as claimed in claim 1, wherein said valve pin regulates the flow of said melt stream through said nozzle towards said mold cavity.

11. An injection molding apparatus as claimed in claim 1, wherein said valve pin regulates the flow of said melt stream through said manifold towards said nozzle and said mold cavity.

12. An injection molding apparatus as claimed in claim 1, wherein said valve pin regulates the flow of said melt stream through said manifold and through said nozzle towards said mold cavity.

* * * * *